(12) United States Patent  
Velagaleti et al.

(10) Patent No.: US 9,344,469 B2  
(45) Date of Patent: May 17, 2016

(54) TECHNIQUES FOR EVENT BASED QUEUING, ORDERING AND TIME SLOT COMPUTATION OF MULTI-MODAL MEETING PRESENTATIONS

(71) Applicant: Cisco Technology, Inc., San Jose, CA (US)

(72) Inventors: DurgaPrasad Velagaleti, Santa Clara, CA (US); Ashok Varadhan, Tracy, CA (US); Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 14/154,707

(22) Filed: Jan. 14, 2014

(65) Prior Publication Data

US 2015/0200982 A1 Jul. 16, 2015

(51) Int. Cl.
- *G06F 15/00* (2006.01)
- *G06F 13/00* (2006.01)
- *H04L 29/06* (2006.01)
- *G06F 3/0481* (2013.01)

(52) U.S. Cl.
CPC ............ *H04L 65/403* (2013.01); *G06F 3/0481* (2013.01); *H04L 65/1069* (2013.01)

(58) Field of Classification Search
CPC ............................ H04L 65/403; G06F 3/0481

USPC ......... 715/752, 753, 716, 757, 780, 758, 811, 715/763–765
See application file for complete search history.

(56) References Cited

U.S. PATENT DOCUMENTS

| | | | |
|---|---|---|---|
| 2005/0125246 A1* | 6/2005 | Muller et al. ...................... | 705/1 |
| 2008/0115087 A1* | 5/2008 | Rollin et al. .................. | 715/811 |
| 2010/0306676 A1* | 12/2010 | Srinivasaraghavan et al. ............................. | 715/758 |
| 2010/0324963 A1* | 12/2010 | Gupta et al. ..................... | 705/9 |
| 2012/0246574 A1* | 9/2012 | Hoard et al. .................. | 715/751 |

FOREIGN PATENT DOCUMENTS

| WO | 2004014054 A1 | 2/2004 |
|---|---|---|
| WO | 2005099197 A1 | 10/2005 |

* cited by examiner

*Primary Examiner* — Kevin Nguyen  
(74) *Attorney, Agent, or Firm* — Lempia Summerfield Katz LLC

(57) ABSTRACT

A scheduling request to schedule an online meeting is received. The online meeting involves a plurality of participants during which multiple participants may become presenters to present content during the online meeting. A presentation queue is generated that includes an ordering of presenters for the online meeting and associated time slots for each of the presenters during the online meeting. Content to display the presentation queue is sent to each of the participants of the online meeting.

24 Claims, 14 Drawing Sheets

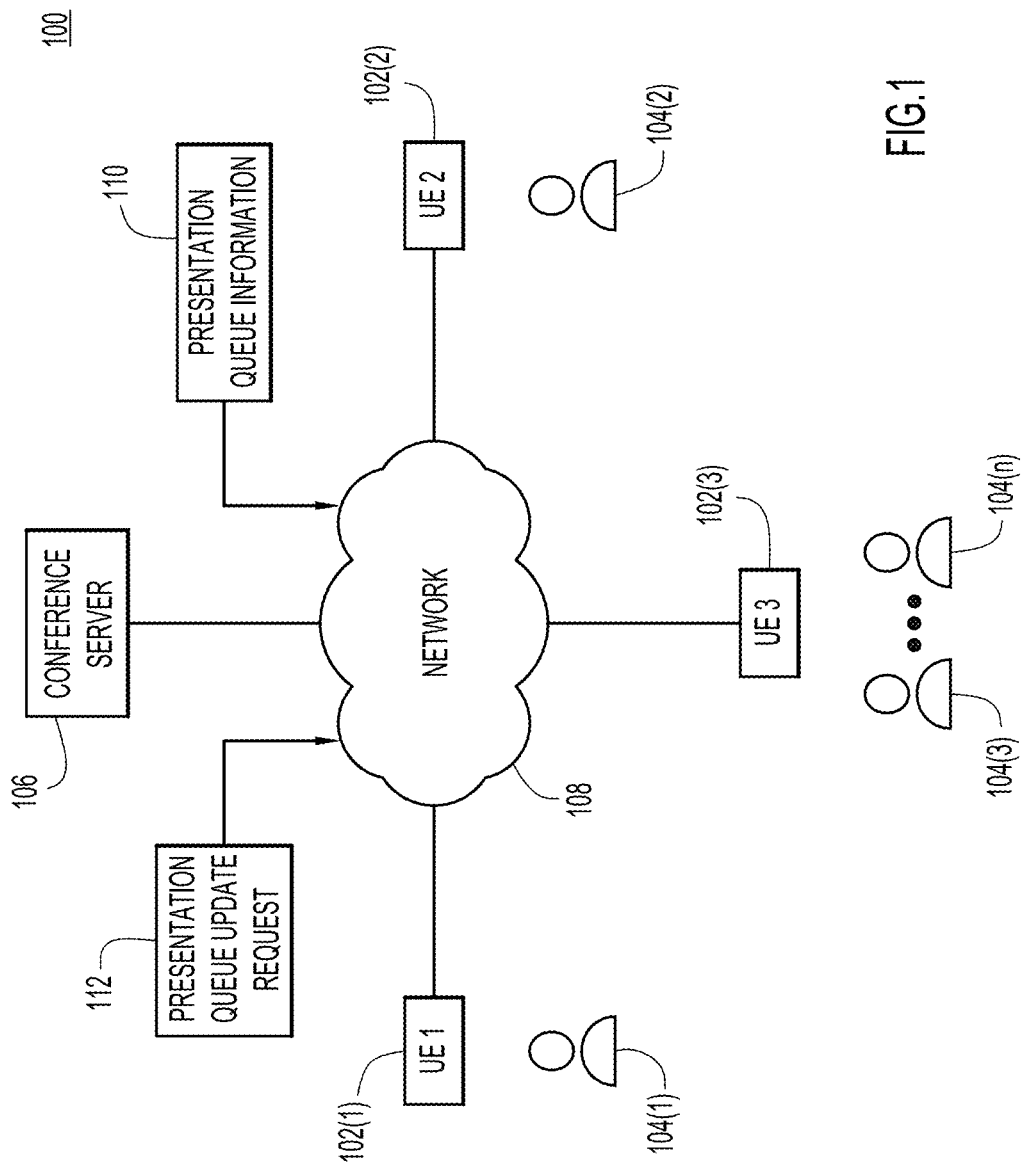

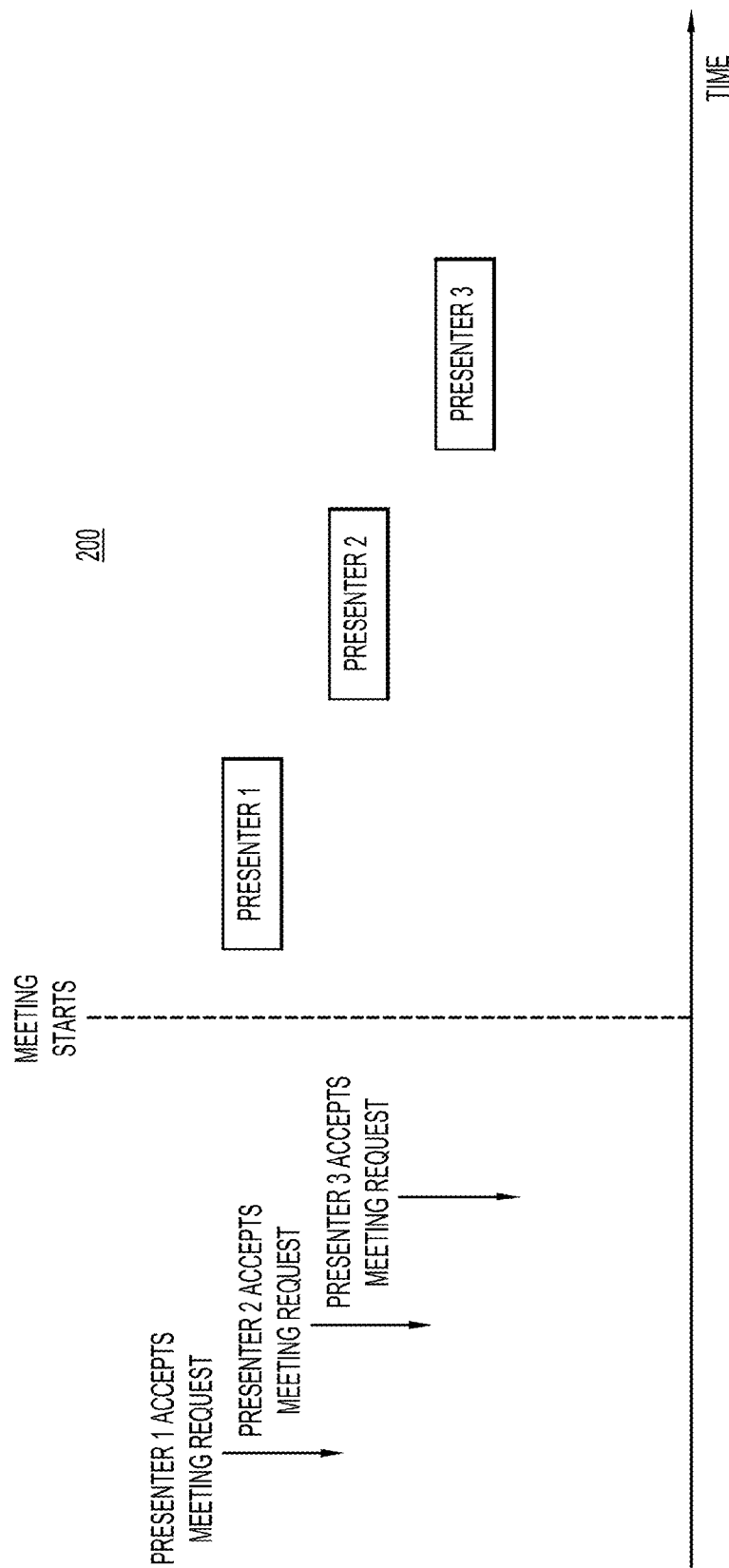

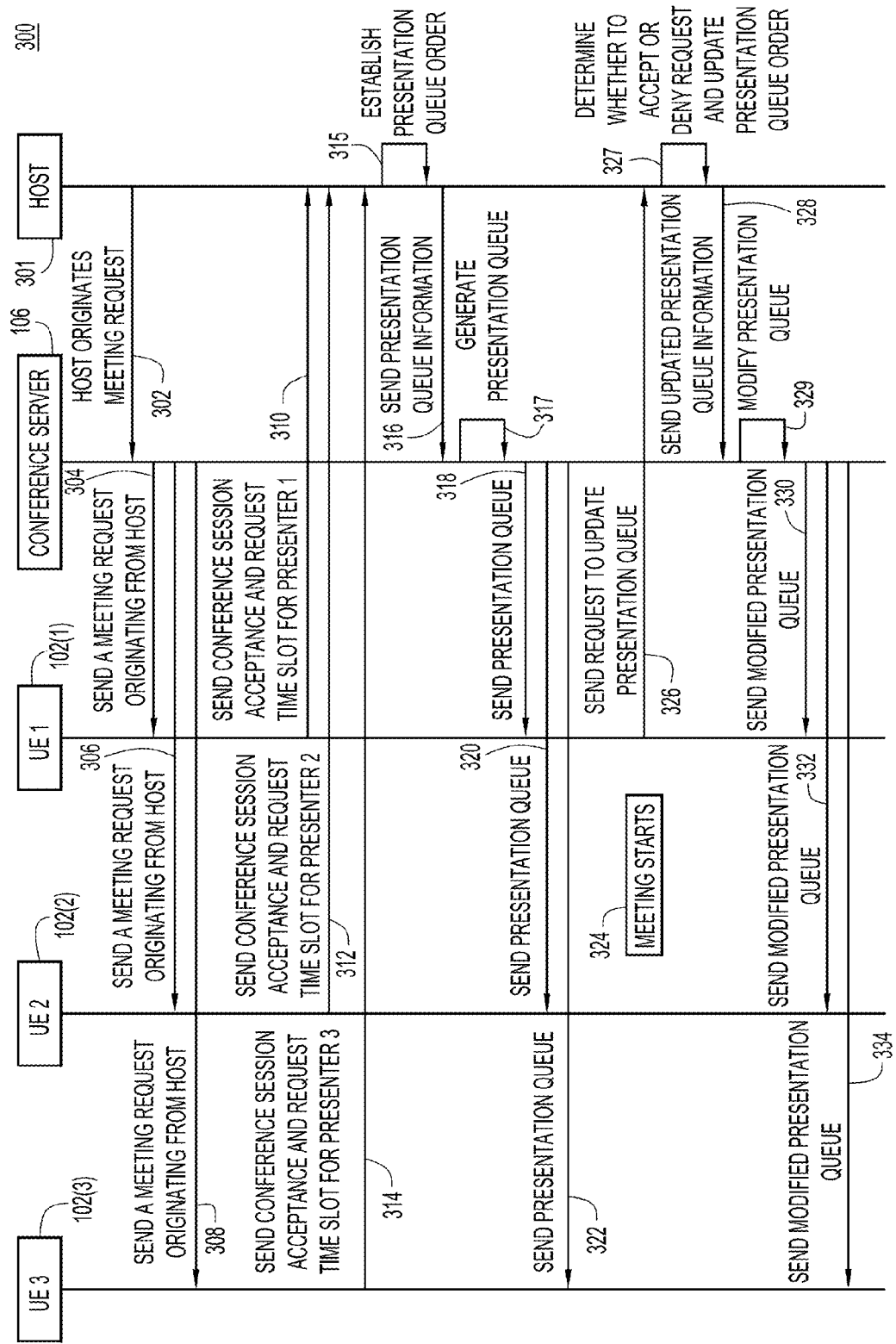

702 — RECEIVE A SCHEDULING REQUEST TO SCHEDULE AN ONLINE MEETING INVOLVING A PLURALITY OF PARTICIPANTS DURING WHICH MULTIPLE PARTICIPANTS MAY BECOME PRESENTERS TO PRESENT CONTENT DURING THE ONLINE MEETING

704 — RECEIVE INFORMATION COMPRISING A PRESENTATION QUEUE THAT LISTS AN ORDER OF PRESENTERS FOR THE ONLINE MEETING AND ASSOCIATED TIME SLOTS FOR EACH OF THE PRESENTERS DURING THE ONLINE MEETING BEFORE THE MEETING BEGINS

FIG.7

TECHNIQUES FOR EVENT BASED QUEUING, ORDERING AND TIME SLOT COMPUTATION OF MULTI-MODAL MEETING PRESENTATIONS

TECHNICAL FIELD

The present disclosure relates to online conference sessions.

BACKGROUND

Online conference sessions enable remote users to interact and collaborate with one another. For example, employees of an enterprise who are located in different geographic locations may utilize an online conference service to organize presentations and share information with each other. A host may set up a conference session for a plurality of participants and may establish a presentation order for presenters of the conference session. The presentation order may be set by the host before the start of the session. The host may also change the presentation order after the start of the session on an ad hoc basis in response to out-of-band requests (e.g., instant messages) from participants.

BRIEF DESCRIPTION OF THE DRAWINGS

FIG. 1 shows an example system depicting a plurality of participants in a conference session and a conference server configured to control a presentation order for the conference session.

FIGS. 2A-2C show examples of a presentation queue generated for the conference session.

FIG. 3 shows an example ladder diagram depicting operations for generating the presentation queue before a conference session and updating the presentation queue during the conference session.

FIGS. 4A-4E show example views of the presentation queue from the perspective of the conference participants.

FIG. 7 shows an example flow chart demonstrating processes for one or more participants receiving the presentation queue.

DESCRIPTION OF EXAMPLE EMBODIMENTS

Overview

Figure 2B:
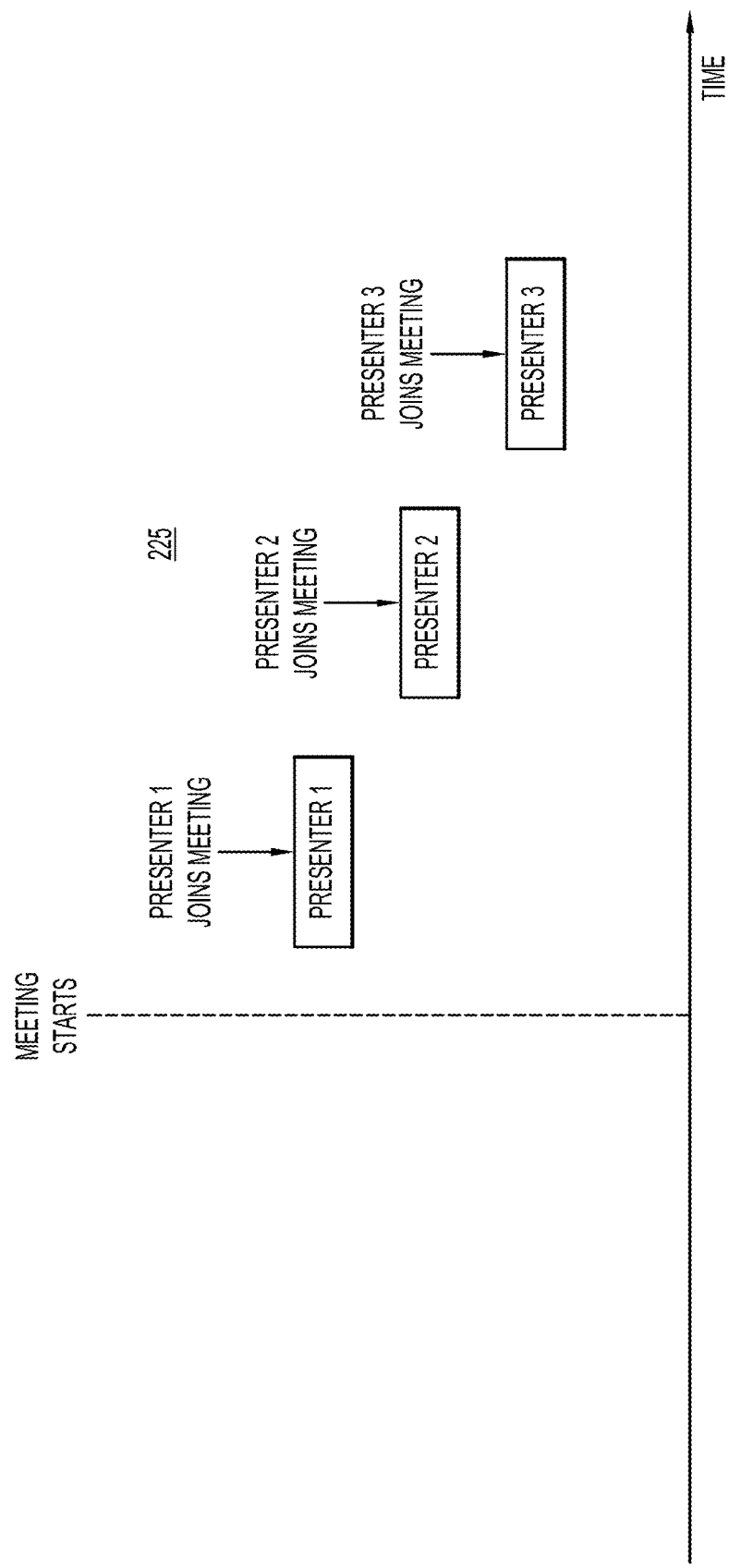

Techniques are described herein for optimizing conference sessions. A scheduling request to schedule an online meeting is received. The online meeting involves a plurality of participants during which multiple participants may become presenters to present content during the online meeting. A presentation queue is generated that includes an ordering of presenters for the online meeting and associated time slots for each of the presenters during the online meeting.

A scheduling request is also sent for the online meeting, and responses are received from the participants indicating whether or not the participants will join the online meeting. Based on the responses, an ordering of presenters for the online meeting and the associated time slots is generated. Additionally, a scheduling request for the online meeting is received. Information is received that comprises a presentation queue that lists ordering of presenters for the online meeting and associated time slots for each of the presenters during the online meeting.

Example Embodiments

The techniques presented herein relate to optimizing ordering of presentations during conference sessions to increase run-time efficiency. In particular, the techniques presented herein describe generating a presentation queue that includes an ordering of presenters of a conference session. As will become apparent hereinafter, the presentation queue may be provided to participants of the conference session before the meeting (in a pre-meeting phase) and during the meeting (in a run time phase). The presentation queue is configurable before and during a conference session to enable the ordering and time slots for presenters to change or be modified as appropriate.

An example system is shown in FIG. 1 at reference numeral 100. The term "conference session" may refer to any audio/video conference that enables local and remote participants to communicate with each other (e.g., online via the Internet or other network connectivity) to share presentation materials with one another via audio and visual displays (e.g., by "sharing a desktop" on an operating system of a computing device). The conference session may enable participants to communicate with each other using multiple modes of presentations (e.g., multi-modal presentations). It should be appreciated that the terms "conference session," "teleconference session," "online meeting," "meeting" and "session" are used interchangeably herein.

FIG. 1 shows a plurality of user equipment devices 102(1)-102(3), a plurality of participants 104(1)-104($n$), a conference server 106 and a network 108. The user equipment devices 102(1)-102(3) are computing devices (e.g., desktop computers, laptop computers, tablets, mobile phones, etc.) that are configured to capture audio, video and other data of respective participants to enable participants to share information with other participants in a conference session. For example, the user equipment devices 102(1)-102(3) may capture audio of a participant and may enable a participant to share his or her "desktop" in order to present documents and other content to other participants in the online conference session. A user equipment device may also be referred to herein as a "user equipment" or "UE." For example, user equipment device 102(1) may be referred to as UE 1, user equipment device 102(2) may be referred to as UE 2 and user equipment device 102(3) may be referred to as UE 3. Likewise, participant 104(1) may be referred to herein as Participant 1, participant 104(2) may be referred to as Participant 2, and so on. It should be appreciated that any number of UEs and participants may be present in the system 100.

Each of the participants 104(1)-104($n$) is located at or in close proximity to one of the UEs. For example, as shown in FIG. 1, participant 104(1) is located in close proximity to UE 1, participant 104(2) is located in close proximity to UE 2 and participants 104(3)-104($n$) are located in close proximity to UE 3.

As stated above, the system 100 has a conference server 106. The conference server 106 (also referred to as a "bridge" or "conference bridge") is a computing device or processor running in cloud computing/data center (with network connectivity) that enables the UEs to communicate with each other across the network 108 (e.g., a wide area network or (WAN) such as the Internet). For example, the conference server 106 is configured to send information (e.g., audio, video and data information) to UEs in a teleconference to enable the respective participants 104(1)-104(n) to communicate with each other.

As described in detail herein, during a conference session, the conference server 106 also provides the UEs with information describing a presentation queue that represents an ordering of presenters during the conference session. The conference server 106 is also configured to update the presentation queue during the conference session in response to receiving presentation queue update requests from one or more UEs. The message comprising the presentation queue information provided by the conference server 106 is shown generally at reference numeral 110, and a message comprising the presentation queue update request provided by the UEs is shown, in an example, at reference numeral 112.

During a conference session, one or more participants may wish to present audio, video and/or other presentation data. These participants are referred to as "presenters." Generally, there can be only one presenter at a time during an online conference session. Often it is desirable for participants to know a presentation order before the teleconference starts. For example, if there are multiple presenters, it may be helpful for timing, efficiency and predictability to generate a presentation queue that includes an order of presentation for each of the presenters, along with time slots indicating the time duration for each ordered occurrence of the respective presentations.

Thus, before the start of a conference session, a host may establish a presentation queue (also referred to as a "presentation order") for the presenters. The host may be an individual who originates the meeting request via a UE, though he or she may not necessarily be a participant of the conference session itself. In another embodiment, the host may also be a participant of the conference session and may also be a presenter. Thus, the term "presenter" as used herein refers to an individual who is presenting during a conference session, the term "host" refers to an individual who originates the meeting and the term "participant" refers to an individual who is a part of the conference session. In some examples, a host may be both a participant of the conference session and also a presenter for a particular time slot of the meeting. Likewise, a presenter may also be a host and also a non-presenter participant when he or she is not presenting. A participant may be presenter or a non-presenter.

In typical conference systems, once a host originates a meeting, the participants have to contact the host individually to receive a presentation queue and to request any changes to the presentation queue. For example, after a meeting has been established, if a participant wants to view the presentation order of the meeting, the participant contacts the host using an out-of-band message (e.g., an instant message or an email) to selectively request the presentation order. Furthermore, if a presenter wants to request a change to the presentation order, either before the meeting or during the meeting (e.g., if he or she is unable to present or wants to present "on-the-fly"), the presenter has to send an out-of-band message to the host to request that the host manually change the presentation queue. In typical multi-modal conference sessions, there is no mechanism for the host to handle or arbitrate presentation requests from the participants. Additionally, there is no mechanism for the host to handle event-based reordering of a presentation queue and to recalculate time slots allocated for presenters. Instead, in order to make any changes, participants have to individually contact the host, and the host has to prioritize and manage such requests on an ad hoc basis. These shortcomings lead to inefficiencies in the presentation order. For example, after a given presenter has finished a presentation, all of the other presenters may send an out-of-band message to a host immediately requesting to be the next presenter, and the host has to weigh these requests individually in order to modify or update the presentation queue. These drawbacks lead to inefficient meetings that place significant burdens on the host to manually manage the presentation order.

The techniques presented herein alleviate these drawbacks by enabling the presentation queue to be shared with participants before and during the conference session. The techniques described herein also enable participants of the conference session to send requests for updating the presentation queue. Thus, as a result of the techniques herein, a host may not need to determine a "next presenter" and may not need to grant presentation access to each "next presenter." Instead, this process may be automated via the presentation queue generation and modification techniques. Additionally, a host does not need to continuously monitor the time duration of a presentation, since, as will become apparent hereinafter, a presenter can request an extension to his presentation time automatically if needed. Furthermore, using the techniques herein, the presentation order during conference sessions is adaptable to change, such that an unexpected disruption in the initial presentation order (e.g., if a presenter is no longer available) does not have a cascading effect for other presentations throughout the conference session.

Figure 2C:
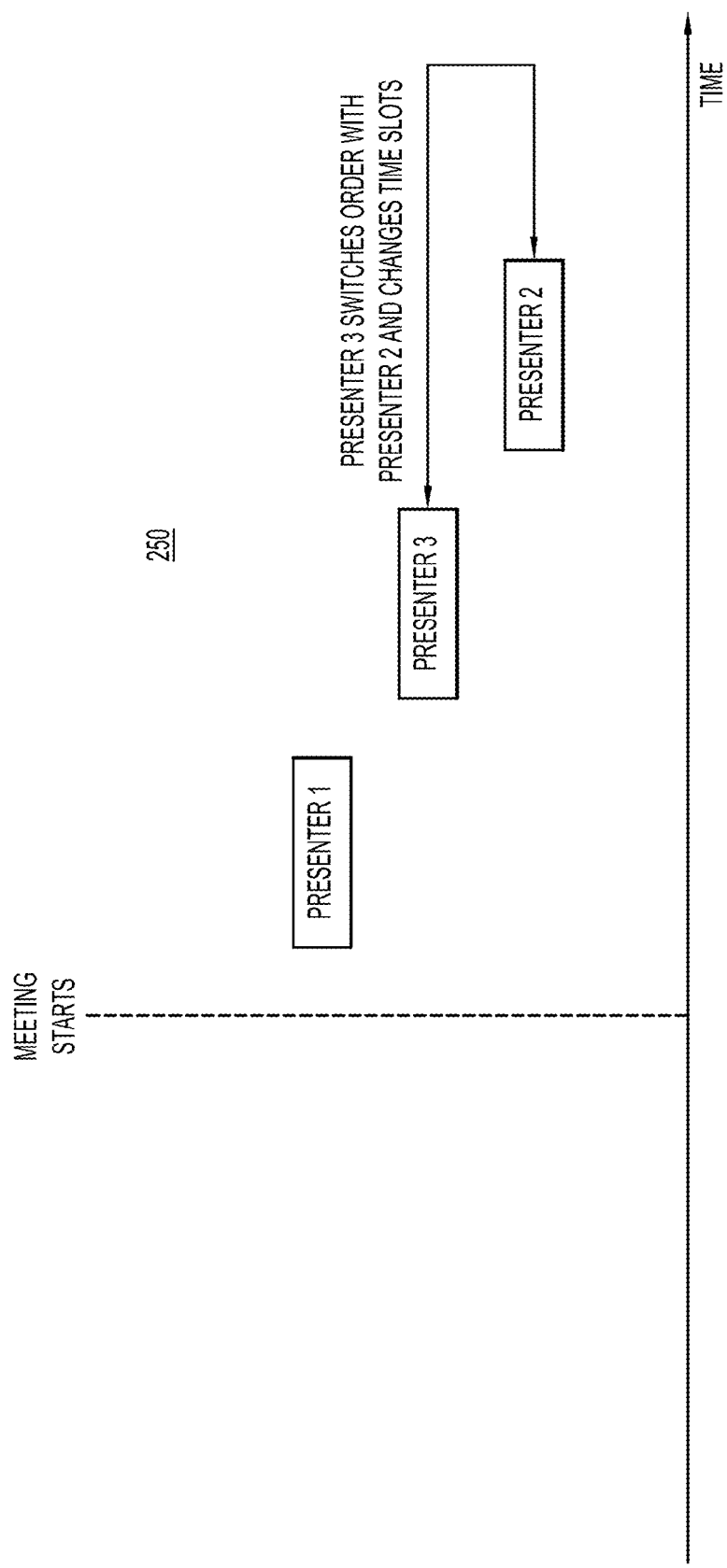

Reference is now made to FIGS. 2A-2C, which show examples of the presentation queue generated for a conference session. Referring first to FIG. 2A, an example of a static presentation queue is shown at reference numeral 200. The static presentation queue 200 shows three presentation time slots, one for each of Presenter 1, Presenter 2 and Presenter 3, corresponding to three different participants in the conference session. In the static presentation queue 200, the presenters are "ordered" during a pre-meeting phase (a time period before the conference session begins). In one example, the presenters may be ordered in the queue based on a First-In First-Out (FIFO) basis by the host who originated the meeting. That is, presenters may be added to the presentation queue based on the order in which they accepted presentation requests. In another example, the presenters may be ordered in the queue based on an alphabetical ordering (e.g., names or email addresses) of the presenters during the pre-meeting phase. Other ordering techniques may be contemplated, such as an a priori ordering by the host based on the relative importance of each presenter. For example, a more senior person in a business organization hierarchy may be placed earlier in the presentation sequence than others.

Referring now to FIG. 2B, an example of a dynamic presentation queue is shown at reference numeral 225. The dynamic presentation queue 225 represents an order of presenters based on, for example, when the presenters join the meeting. For example, as shown in FIG. 2B, a presentation queue may be generated as each presenter joins the meeting. Thus, a host may receive information before the meeting as to which presenters intend to make a presentation during the meeting, and the presentation queue may be modified as the presenters join. In this example, a participant (Presenter 1) first joins the meeting and he/she is placed first in the presentation queue. Subsequently, another participant (Presenter 2) joins the meeting and he/she is placed second in the presentation queue, and so on.

Referring to FIG. 2C, another example of a dynamic presentation queue is shown at reference numeral 250. The dynamic presentation queue 250 in FIG. 2C shows Presenter 2 switching a presentation order with Presenter 3. In this example, Presenter 2 may send a presentation queue update request (via UE 2) to the conference server 106 to request an update to the presentation queue. This request is also referred to herein as a "request event." The request event may be sent as the meeting is in progress. Specifically, Presenter 2 may request that his presentation order be placed after Presenter 1 and before Presenter 3. The conference server 106 receives this request event, and may also receive other request events from other presenters. The conference server 106 may then process each request event in a FIFO order to modify the presentation queue. For example, as shown in FIG. 2C, Presenter 2 may request that his presentation order be placed after Presenter 1 and may also request additional time for his presentation. At a subsequent time, another presenter may send another request event to the conference server 106 requesting that his presentation also be placed in the presentation queue after Presenter 1.

In general, when the conference server 106 receives multiple request events, the conference server 106 may assign a relative weight to request events based on factors such as importance of the presenters, time of receipt of the request events, etc., and may modify the presentation queue accordingly. The relatively weightings may be controlled/adjusted based on input received from the meeting host in advance of the conference session or during the conference session. The conference server 106 may assign the relative weight and may select priorities for the request events at the request of the host. For example, the relative weight for each of the request events may indicate relative priorities of the request events with respect to each other. Ordering associated with higher weighted request events may be applied before ordering associated with lower weighted request events. It should be appreciated that a request event may result from one or more of the following events: a participant accepting to be a presenter, a participant joining the meeting, a participant making an explicit request to present, a participant making a request to extend the presentation, a participant making a swap-request with another participant, an alert indicating a presentation timeslot expiration, a new participant being added to the presentation, a participant being late to a meeting or having trouble joining the meeting (e.g., thus resulting in the cancellation or postponement of the presentation time slot), and a participant dropping from the presentation. These are merely examples of request events, and other request events may be contemplated. Request events may be generated using, e.g., an Extensible Messaging and Presence Protocol (XMPP) or other infrastructure.

It should be appreciated that the presentation queue may also be a hybrid queue, comprising attributes of the static presentation queue depicted in FIG. 2A and the dynamic presentation queues depicted in FIGS. 2B and 2C. For example, the presentation queue may be pre-computed during the pre-meeting phase and may be dynamically altered during the run-time phase of the meeting (e.g., after the meeting starts).

Reference is now made to FIG. 3. FIG. 3 shows an example ladder diagram 300 depicting operations for generating the presentation queue before a conference session and updating the presentation queue during the conference session. FIG. 3 shows exchanges between UE 1, UE 2, UE 3, the conference server 106 and a host. The host is shown at reference numeral 301 in FIG. 1. It should be appreciated that the host 301 may interact with the conference server 106 via a UE associated with the host 301. At reference numeral 302 in FIG. 3, a host originates a meeting request for a conference session by sending a message to the conference server 106 (e.g., via the host's UE). The meeting request is intended to ultimately be sent to potential participants of the conference session. It should be appreciated that the operations for sending the meeting requests, establishing the meeting, generating the presentation queue and modifying the presentation queue may be performed at the conference server 106. Upon receiving the meeting request message from the host, the conference server 106, at reference numeral 304, sends a meeting request to UE 1. At 306 and 308, the conference server 106 sends a meeting request to UE 2 and UE 3, respectively. The meeting requests may comprise a proposed presentation order with proposed time slots. At reference numeral 310, UE 1 sends to the host 301 an acceptance message to join the conference session and also sends to the host 301 a request for a presentation time slot for Participant 1. Likewise, at reference numerals 312 and 314, UE 1 and UE 2 send to the host 301 an acceptance message to join the conference session and also send to the host 301 a request for a presentation time slot for Participants 2 and 3, respectively.

At 315, the host 301 receives the acceptance messages and establishes a presentation queue order. As stated above, the host 301 may establish the presentation queue order based on a priori information about the presenters, or may order the presentation queue using other techniques. The host 301 then, at 316, sends presentation queue information to the conference server 106 providing the conference server 106 with information as to how to generate and order the presentation queue. At 317, the conference server 106 generates a presentation queue (e.g., based on the information received from the host 301). The presentation queue is generated during the pre-meeting phase (before the conference session starts) and incorporates the time slot requests of Participant 1, Participant 2 and Participant 3. For example, the presentation queue may be generated based on a FIFO ordering of when the acceptance messages were received by the conference server 106 or by other criteria (such as weighted importance of each presenter and the discretion of the host or an administrator). After generating the presentation queue, the conference server 106 sends, at reference numeral 318, the presentation queue information to UE 1, to UE 2 at reference numeral 320 and to UE 3 at reference numeral 322. Thus, upon receiving the presentation queue information, the UEs may display the ordering and time slot information in the presentation queue to the conference session participants. The UEs may display this information on a window or other display visible to the participants. In one example, it should be appreciated that participants may be invited to the conference session for only a portion of the session itself. That is, in one example, presenters may be invited to the conference session only for the duration of their presentation, and after their presentation ends, the presenters may be removed from the conference session (e.g., at the discretion of the host).

It should be appreciated that the operations described with respect to reference numerals 302 to 322 occur in the pre-meeting phase, before a conference session begins. At reference numeral 324, the conference session starts. Once the conference session starts, the teleconference is said to be in the run time or in-meeting phase. At reference numeral 326, Presenter 1 (via UE 1) sends a request to the host 301 to update the presentation queue (e.g., a request event). Presenter 1 may request an update to the presentation queue for several reasons, as described above. For example, Presenter 1 may wish to extend the time duration of his presentation, and thus may request that the presentation queue be updated to reflect this change. In another example, Presenter 1 may wish to present later than originally planned, and thus may request that the ordering in the presentation queue be updated. These request events are merely examples, and other request events may be sent by any participant in the teleconference.

At 327, the host 301 receives the request event from Presenter 1 and determines whether to accept or deny the request. In one example, the host 301 may ignore the update request entirely, or may prioritize the update request with other update requests received from other participants (e.g., priority based request event queuing). Based on this determination, the host 301 updates the presentation queue order. For simplicity, it is assumed that the host 301 accepts the request event by Presenter 1 and updates the presentation queue, though it should be appreciated that if the host 301 denies the request, the presentation queue may not be updated since there would be no change in the ordering of presenters. It should be appreciated that the operation described in connection with reference numeral 327 may occur continuously for multiple request events. That is, for each request event the host 301 may determine whether to accept or deny the request.

The host 301, at 328, sends update presentation queue information to the conference server 106. At 329, the conference server 106 receives the update information from the host 301 and modifies the presentation queue in response to receiving the request from UE 1. At reference numeral 330, 332 and 334, the conference server 106 sends the modified presentation queue information to UE 1, UE 2 and UE 3, respectively. The modified presentation queue, for example, incorporates the requests made by Presenter 1, and upon receiving the modified presentation queue information, the UEs may display the ordering and time slot information in the modified presentation queue to the conference session participants.

It should be appreciated that the time slots for each presenter is customizable and each presentation time slot may be recomputed automatically (e.g., by the conference server 106) based on the queued order. Each time slot for the presenters may be of an equal, pre-configured length (e.g., 30 minutes, 60 minutes, etc.), and options can be provided to the presenters to make the time slots customizable to enable the presenters to extend individual time slot durations. The time slots may also be dynamic time slots, where an administrator (e.g., host) may select a time duration for each participant, and as the participants join the teleconference, they may be informed of their time slot assignment and may be provided with a subsequent option to modify the time slot assignment. A presenter can thus request and reserve time slots in the pre-meeting phase and may request a modification to the time slot during the run time phase of the meeting.

Reference is now made to FIGS. 4A-4E. FIGS. 4A-4E show example views of the presentation queue from the perspective of the teleconference participants. In general the depictions in FIGS. 4A-4E illustrate examples of how the presentation queue is displayed to the conference participants via respective UEs (e.g., in a display window at the UE).

Figure 4A:
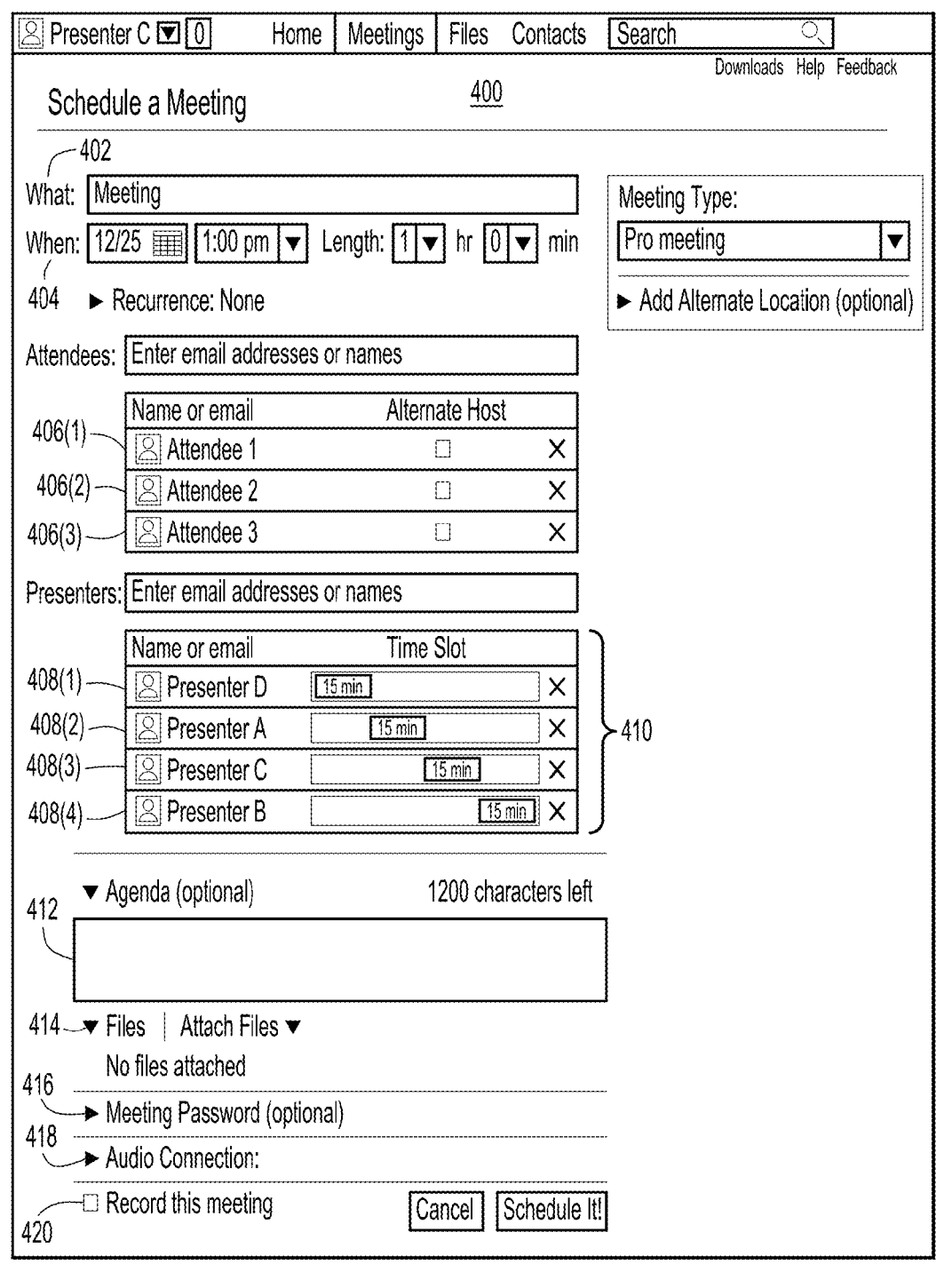

Referring first to FIG. 4A, an example of a meeting request is shown at 400 with the participants responses. In FIG. 4A, the meeting request 400 lists information about the meeting including a subject line 402 and a meeting time 404. The meeting request 400 also lists the participants of the meeting. The participants include the attendees (e.g., non-presenters of the meeting), shown at reference numerals 406(1)-406(3), and presenters, shown at reference numerals 408(1)-408(4). Additionally, the meeting request 400 shows a proposed presentation queue 410, which lists the pre-meeting ordering of the presenters as well as time slots that are assigned for each presentation. In one example, the ordering of the presentation queue 410 is determined based on an order determined a priori by a host. In one example, when a host schedules a meeting, the host may list the presenters in a default order. The host may provide participants with the option to change the order, or the host may lock the presentation order. However, as described by the techniques herein, this ordering may change before or during the meeting at the request of one or more participants. The meeting request 400 has an optional agenda field 412, and options to attach a file at 414, to set a meeting password at 416, to establish an audio connection at 418 and to record the meeting at 420.

Figure 4B:
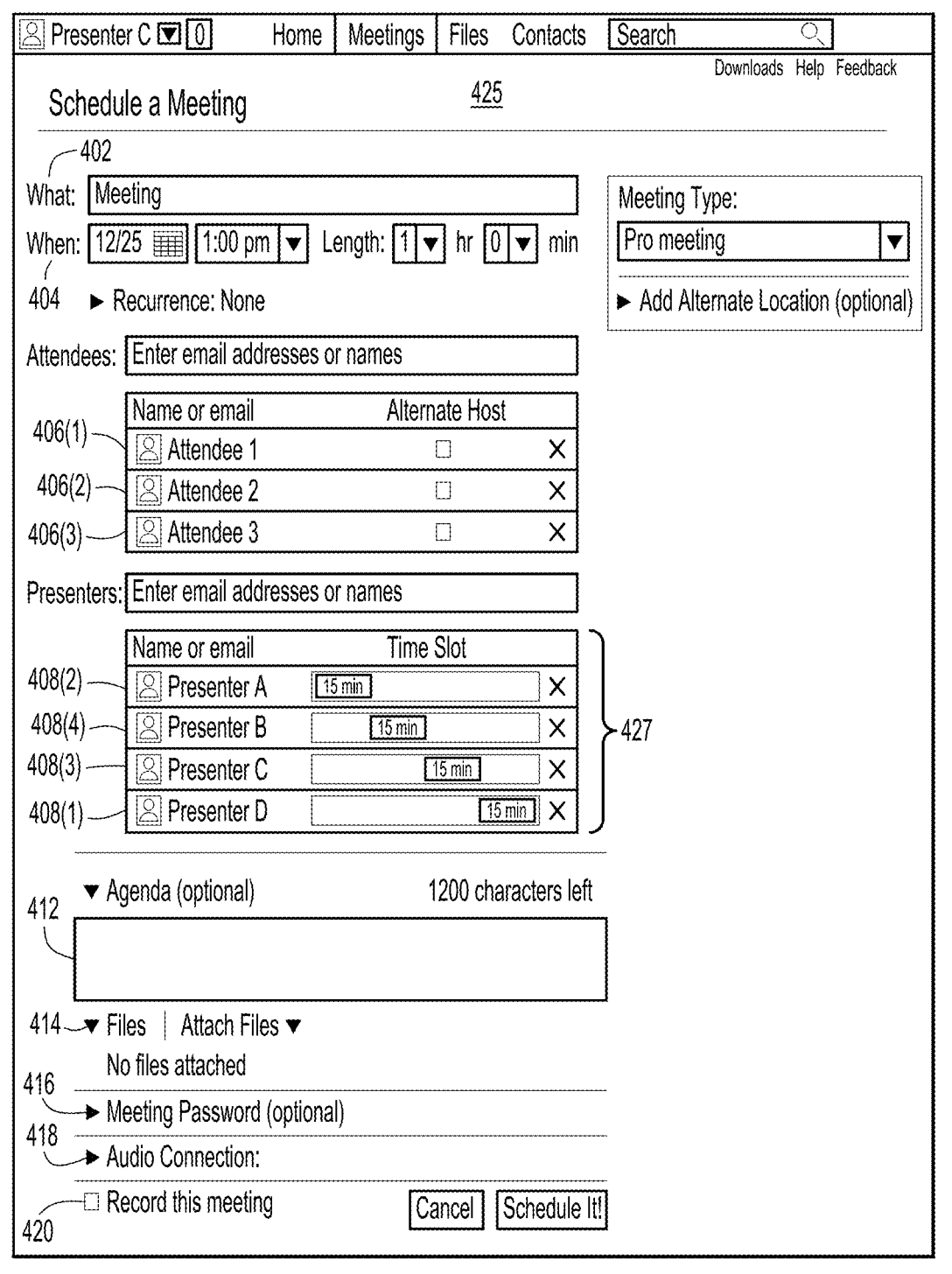

Referring now to FIG. 4B, another example meeting request is shown at 425. The meeting request 425 comprises the subject line 402 and the meeting time 404, similar to FIG. 4A. The meeting request 425 in FIG. 4B also has the optional agenda field 412, file attachment 414, meeting password option 416, audio connection option 418 and recording option 420, as described in connection with FIG. 4A. The meeting request 425 also lists the participants, including the attendees at 406(1)-406(3) and the presenters at 408(1)-408(4). The presentation queue 427, however, is different from the presentation queue 410 in connection with FIG. 4A in that the presentation queue 427 in FIG. 4B is a reordering of the presentation queue 410 shown in FIG. 4A. The presentation queue 427 in FIG. 4B lists the presenters in alphabetic order, whereas the presentation queue 410 in FIG. 4A lists the presenters in another predetermined order (e.g., a FIFO ordering or other ordering determined a priori).

Figure 4C:

Reference is now made to FIG. 4C, which shows the pre-meeting phase meeting information 475 before the meeting begins. Specifically, the meeting information 475 in FIG. 4C shows information after participants have accepted the meeting and after the pre-meeting presentation queue has been finalized. In FIG. 4C, a non-exhaustive list of the attendees are shown at 477 and the presenters are shown at 408(1)-408(4) in the presentation queue 427 of FIG. 4B. The presentation queue 427 lists the pre-meeting presentation order, though this presentation order may be changeable during the meeting, as described herein.

Figure 4D:
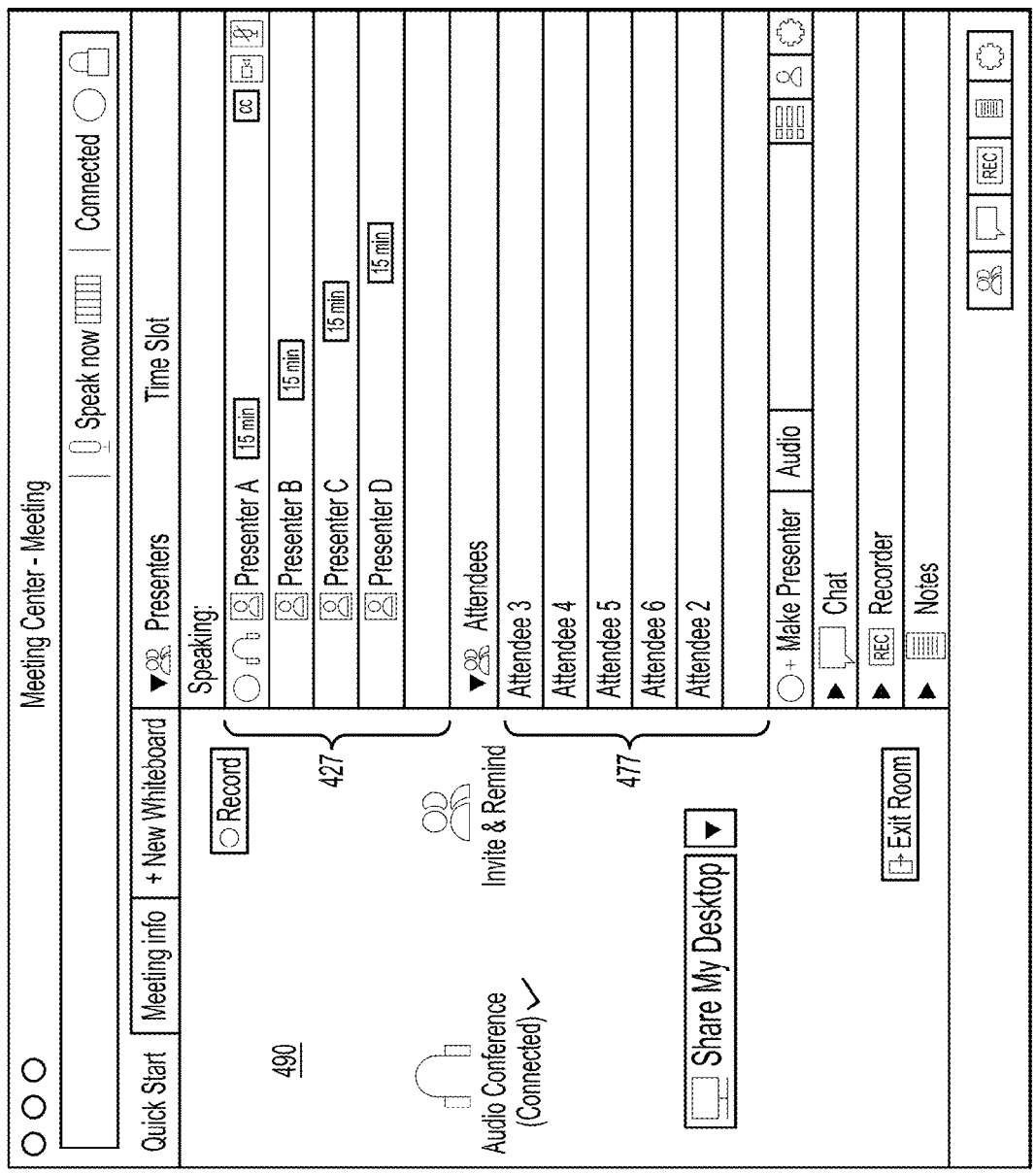

Referring now to FIG. 4D, an example run-time (during the meeting) display is shown at 490. The run-time display shows the presentation queue at 427 (still in the order of FIG. 4B at this point) as well as the list of attendees at 477.

Figure 4E:
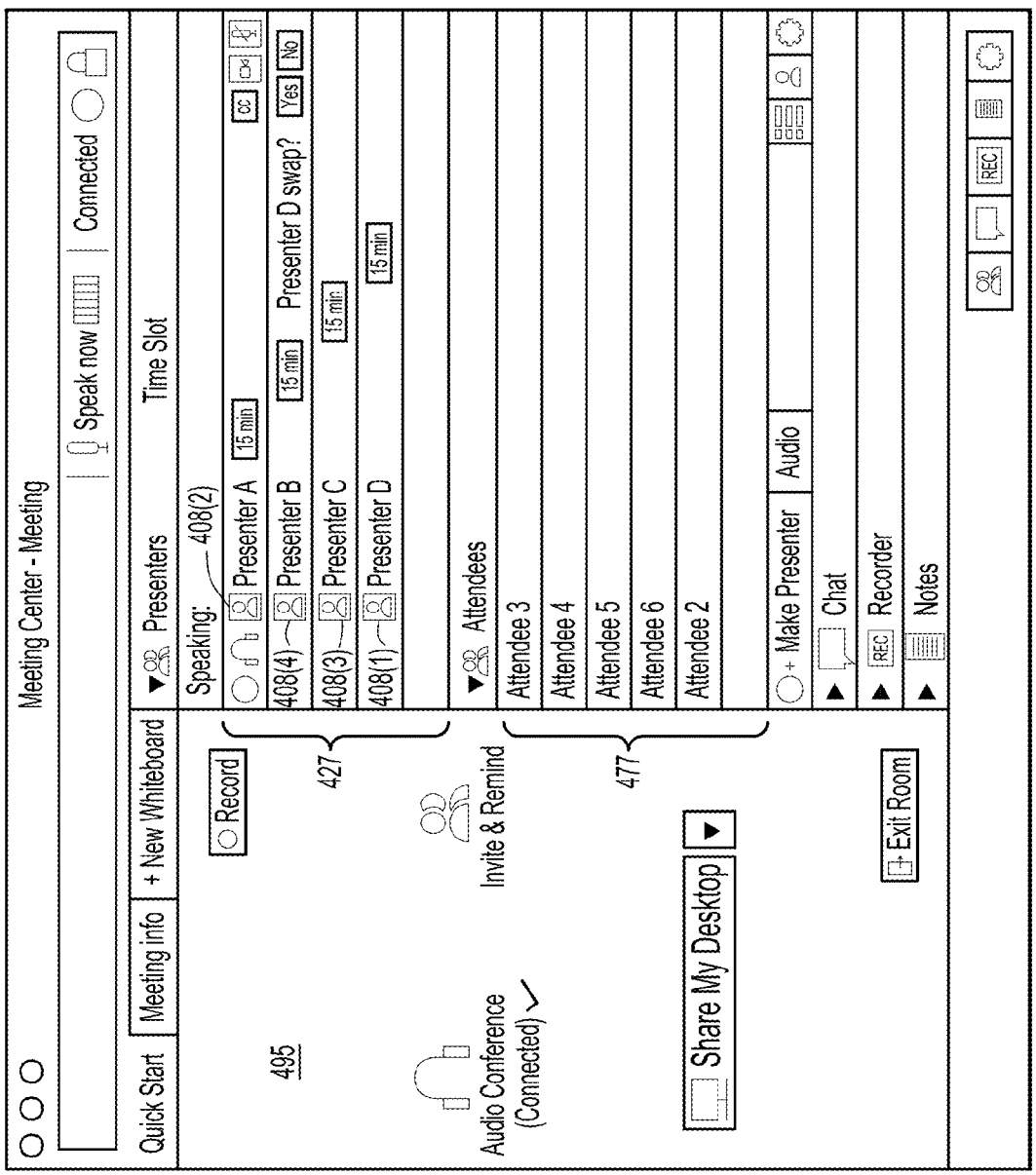

In FIG. 4E, an example is shown in which a request event 495 is made that indicates a request to change the ordering of the presentation queue 427. The request event 495 in FIG. 4E shows a swapping request, where one presenter, presenter 408(1), is requesting to swap presentation time slots with another presenter, presenter 408(4). However, it should be appreciated that the request event 495 may be any of the request events described above. In one example, a presenter can send a request message to change only his/her own presentation order and not the presentation order of other presenters. If a host accepts the request event 495, the conference server 106 will update the presentation queue 427 accordingly and will send an updated view of the presentation queue to the UEs for display to the participants.

Figure 5:
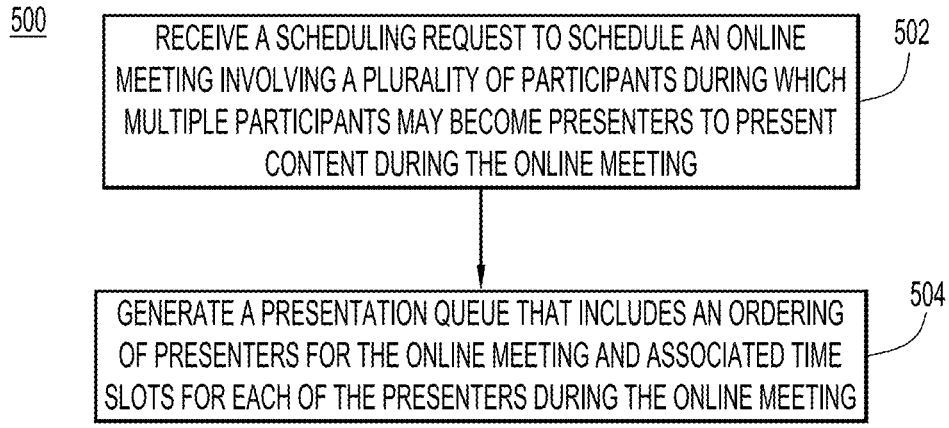
FIG. 5 shows an example flow chart demonstrating processes for the conference server generating the presentation queue.

Reference is now made to FIG. 5. FIG. 5 shows an example flow chart 500 depicting operations of the conference server 106 in generating the presentation queue. At operation 502, the conference server receives a scheduling request (e.g., from a host) to schedule an online meeting involving a plurality of participants during which multiple participants may become presenters to present content during the online meeting. At operation 504, a presentation queue is generated. The presentation queue includes an ordering of presenters for the online meeting and associated time slots for each of the presenters during the online meeting. As described above in connection with FIGS. 4A-4E, the presentation queue is sent to each of the participants in the conference session in order to display the presentation queue in a window to each of the participants.

Figure 6:
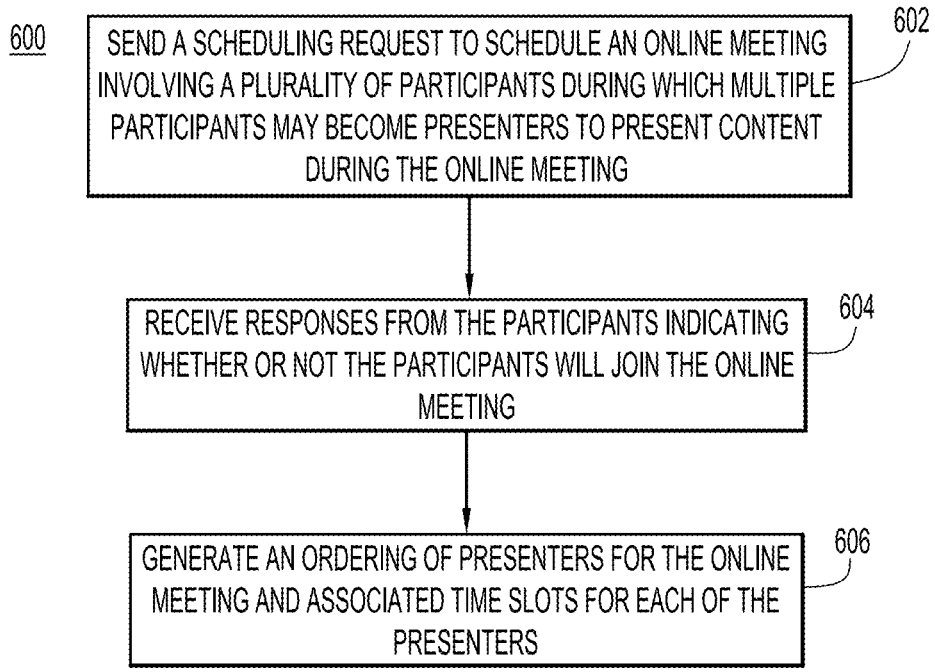
FIG. 6 shows an example flow chart demonstrating processes for the host instructing the conference server to generate the presentation queue.

Reference is now made to FIG. 6, which shows an example flow chart 600 depicting operations performed by a host (e.g., via a UE) for generating the presentation queue. At operation 602, the host sends a scheduling request to schedule an online meeting involving a plurality of participants during which multiple participants may become presenters to present content during the online meeting. At operation 604, responses are received from the participants indicating whether or not the participants will join the online meeting. Based on the responses, at operation 606, an ordering of presenters for the online meeting and associated time slots for each of the presenters is generated.

Reference is now made to FIG. 7. FIG. 7 an example flow chart 700 for operations performed for one or more participants receiving the presentation queue information. At operation 702, a participant (e.g., a presenter or a non-presenter) receives a scheduling request to schedule an online meeting involving a plurality of participants during which multiple participants may become presenters to present content during the online meeting. At 704, a participant receives information comprising a presentation queue that lists an order of presenters for the online meeting and associated time slots for each of the presenters during the online meeting before the meeting begins.

Figure 8:
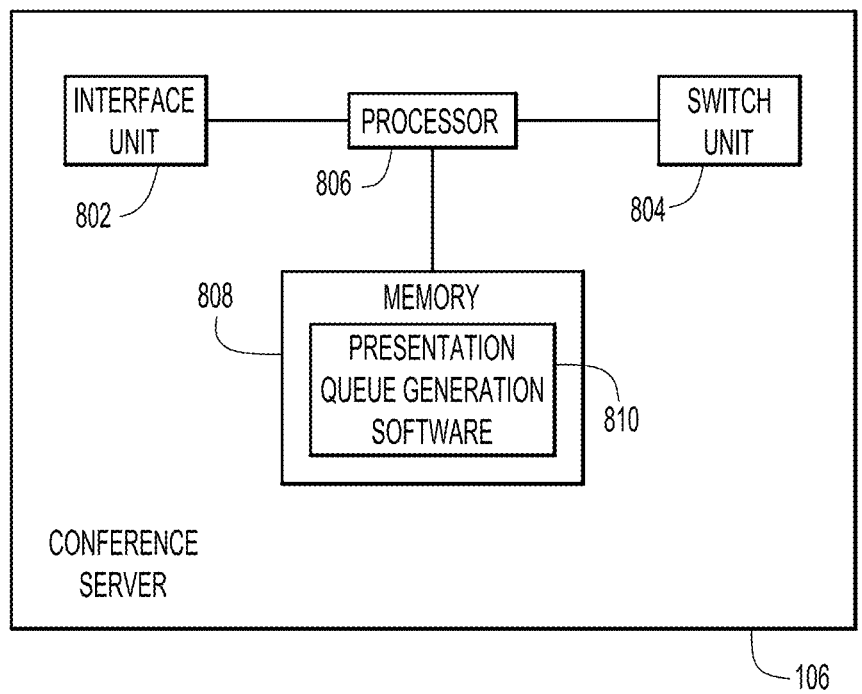
FIG. 8 shows an example block diagram of the conference server that is configured to generate and update the presentation queue.

Reference is now made to FIG. 8, which shows an example of a block diagram of the conference server 106. The conference server 106 comprises, among other components, an interface unit 802, a switch unit 804, a processor 806 and a memory 808. The interface unit 802 is configured to receive messages (e.g., audio, video and data communications) from the UEs 102(1)-102(3) and to send messages to the UEs 102(1)-102(3). In general, the interface unit 802 is a network interface unit or device, e.g., Ethernet card, configured to send and receive messages over a network.

The switch unit 804 is configured to receive data from the interface unit 802 and to determine which UE in the system 100 to which the data should be routed. The switch unit 804 enables the conference server 106 to send audio, video and data communications (including the presentation queue information) between UEs in the system 100.

The interface unit 802 and the switch unit 804 are coupled to the processor 806. The processor 806 is, for example, a microprocessor or microcontroller that is configured to execute program logic instructions for carrying out various operations and tasks described herein. For example, the processor 806 can execute the presentation queue generation software 810 stored in memory 808 in order to send presentation queues to the UEs and to update the presentation queues, as described by the techniques herein. The memory 808 may comprise read only memory (ROM), random access memory (RAM), magnetic storage media, optical storage media, flash memory, electrical, or other physical/tangible (non-transitory) memory. the processor 806 also may be perform the audio and video mixing functions of the conference server 106 in order to send appropriate data streams to the respective UEs during a conference session.

The functions of processor 806 may be implemented by logic encoded in one or more tangible computer readable media (e.g., embedded logic such as an application specific integrated circuit, digital signal processor instructions, software that is executed by a processor, etc.) wherein memory 808 stores data used for the operations described herein and stores software or processor executable instructions that are executed to carry out the operations described herein.

The presentation queue generation software 810 may take any of a variety of forms, so as to be encoded in one or more tangible computer readable memory media or storage device (e.g., memory 808) for execution, such as fixed logic or programmable logic (e.g., software/computer instructions executed by a processor). In some embodiments, the processor 806 is an application specific integrated circuit (ASIC) that includes fixed digital logic, programmable logic, or a combination thereof. For example, the processor 806 may be embodied in digital logic gates in a fixed or programmable digital logic integrated circuit, where the digital logic gates are configured to perform instructions of the presentation queue generation software 810. In another form, the presentation queue generation software 810 may be embodied in one or more tangible computer readable storage media encoded with software comprising computer executable instructions that when executed are operable to perform the operations described herein.

Figure 9:
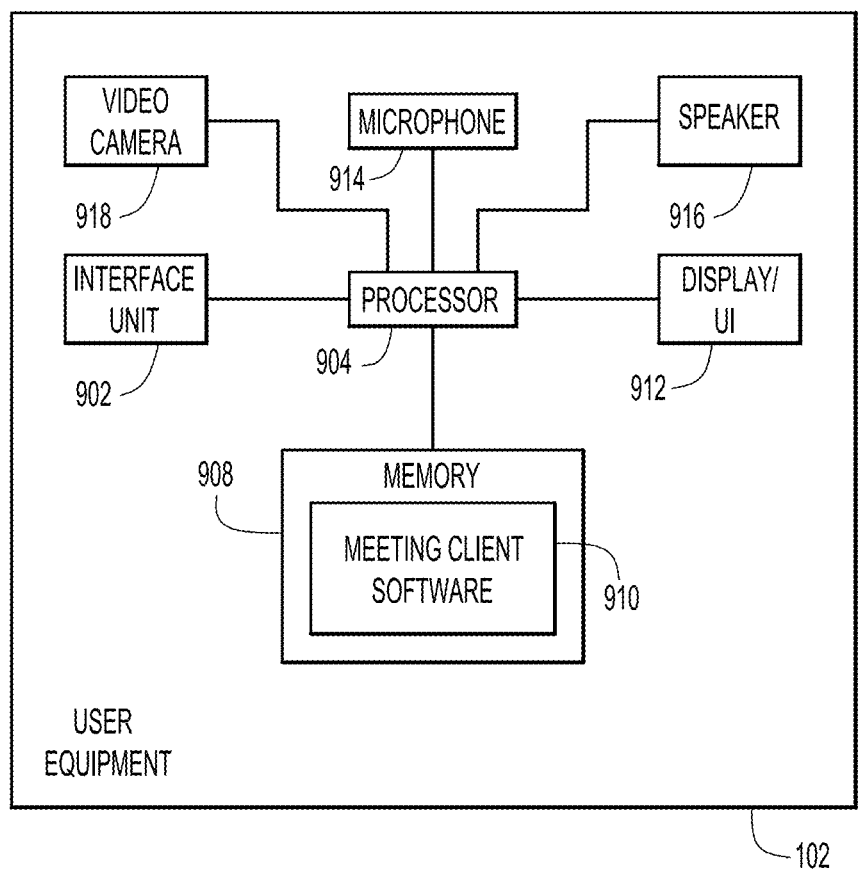
FIG. 9 shows an example block diagram of a user equipment device configured to receive information about the presentation queue and to send requests to the conference server to update the presentation queue.

Reference is now made to FIG. 9, which shows an example block diagram 102 of a UE that is configured/enabled to perform the operations described herein. It should be appreciated that the UE 102 may represent any of the UEs described in connection with FIG. 1, above. The UE 102 in FIG. 9 comprises a network interface unit 902, a processor 904 and a memory 908. The network interface unit 902 operates similarly to the interface unit 802 of the conference server 106. Specifically, the network interface unit 902 enables the UE 102 to send and receive messages from the conference server 106 across the network 108, described in connection with FIG. 1. The network interface unit 902 is coupled to the processor 904. The processor 904 is similar to the processor 806 of the conference server 106 described in FIG. 8. The processor 904 of the UE 102 is configured to execute the meeting client software 910 stored in memory 908 in order to present the presentation queue information from the conference server 106 and to send requests to the conference server 106 to update the presentation queue, as described by the techniques herein. The memory 908 is similar to the memory 808 described in connection with FIG. 8. The UE 102 further includes a display/user interface (UI) 912 that is capable of displaying content to a user and receiving input from a user, e.g., a keyboard, mouse, touchscreen or any combination thereof. The UE 102 also includes a microphone 914 to capture audio from a user, a loudspeaker 916 to present audio to a user and a video camera 918 to capture video of a user.

It should be appreciated that the techniques described above in connection with all embodiments may be performed by one or more computer readable storage media that is encoded with software comprising computer executable instructions to perform the methods and steps described herein. For example, the operations performed by the UE 1, UE 2, UE 3 and the conference server 106 may be performed by one or more computer or machine readable storage media or device executed by a processor and comprising software, hardware or a combination of software and hardware to perform the techniques described herein.

In summary, a computer-implemented method is provided comprising: receiving a scheduling request to schedule an online meeting involving a plurality of participants during which multiple participants may become presenters to present content during the online meeting; and generating a presentation queue that includes an ordering of presenters for the online meeting and associated time slots for each of the presenters during the online meeting.

In addition, a computer-implemented method is provided comprising: sending a scheduling request to schedule an online meeting involving a plurality of participants during which multiple participants may become presenters to present content during the online meeting; receiving from the participants responses indicating whether or not the participants will join the online meeting; and based on the responses, generating an ordering of presenters for the online meeting and associated time slots for each of the presenters during the online meeting.

Furthermore, a computer-implemented method is provided comprising: receiving a scheduling request to schedule an online meeting involving a plurality of participants during which multiple participants may become presenters to present content during the online meeting; and receiving information comprising a presentation queue that lists ordering of presenters for the online meeting and associated time slots for each of the presenters during the online meeting before the meeting begins.

The foregoing methods summarized above may also be embodied by an apparatus including a network interface unit that enables network communication and a processor configured to perform the aforementioned methods. Furthermore, the foregoing methods may be embodied in computer readable storage media that is encoded with instructions that, when executed by one or more processors, causes the one or more processors to perform the aforementioned methods.

The above description is intended by way of example only. Various modifications and structural changes may be made therein without departing from the scope of the concepts described herein and within the scope and range of equivalents of the claims.

What is claimed is:

1. A computer-implemented method comprising:
   receiving, by an interface unit coupled to a server processor, a scheduling request to schedule an online meeting involving a plurality of participants during which multiple participants become presenters to present content during the online meeting;
   generating, by the server processor, a presentation queue that includes an ordering of presenters for the online meeting including on a first time slot for a first presenter and a second time slot for a second presenter;
   storing, in a memory, the presentation queue; and
   sending, by the server processor, the presentation queue to the plurality of participants.

2. The method of claim 1, wherein generating comprises generating the presentation queue with the ordering of the presenters before the meeting based on a predetermined ordering set by a host of the online meeting.

3. The method of claim 1, wherein generating comprises generating the presentation queue with the ordering of the presenters before the meeting based on an alphabetic ordering of the presenters.

4. The method of claim 1, wherein the sending of the generated presentation queue to the participants occurs before the online meeting begins.

5. The method of claim 1, further comprising:
   receiving, by the interface unit from one of the plurality of participants of the online meetings a request to modify the presentation queue; and
   modifying, by the server processor, the presentation queue based on the request.

6. The method of claim 5, further comprising:
   sending, by the server processor, the modified presentation queue to the plurality of participants.

7. The method of claim 5, further comprising:
   sending the request to modify the presentation queue to a meeting host; and
   receiving acceptance of the request from the meeting host; wherein the modifying is responsive to receiving the acceptance from the meeting host.

8. The method of claim 5, further comprising:
   receiving a plurality of requests to modify the presentation queue;
   storing the requests in a request message queue based on an order of receiving the requests; and
   assigning a relative weight to each of the requests according to relative priorities of the requests.

9. The method of claim 8, wherein modifying comprises modifying the presentation queue based on higher priority requests before modifying the presentation queue based on lower priority requests.

10. The method of claim 8, wherein modifying comprises modifying the presentation queue based on the order of requests in the request message queue.

11. The method of claim 5, wherein receiving the request to modify the presentation queue comprises receiving from the participant a request comprising one or more of:
    an acceptance message to be a presenter during the meeting;
    a message from the participant indicating that the participant has joined the meeting;
    a message from the participant to present during the meeting;
    a message from the participant requesting to modify a time slot; and
    a message from the participant making a swap-request with another participant.

12. The method of claim 1, further comprising:
    modifying the presentation queue based on one or more of an indication that a particular time slot has expired, and an indication that one of the plurality of participants has disconnected from the online meeting.

13. The method of claim 1, further comprising:
    modifying the presentation queue before the meeting or during the meeting.

14. The method of claim 1, wherein generating comprises generating a static presentation queue in which the presenters are ordered and the associated time slots are assigned based on either a first-in first-out basis or a predetermined presentation order.

15. The method of claim 1, wherein generating comprises generating a dynamic presentation queue in which an order of the presenters is determined based on request events received by presenters during the meeting.

16. The method of claim 1, wherein generating comprises generating the presentation queue that is static before the meeting begins and that may be changed dynamically during the meeting.

17. The method of claim 1, further comprising:
    displaying the presentation queue in a window to each of the plurality of participants.

18. A computer-implemented method comprising:
    sending, by a server processor, a scheduling request to schedule an online meeting involving a plurality of participants during which multiple participants become presenters to present content during the online meeting;

receiving, by an interface unit coupled to the server processor, from at least one of the plurality of participants responses indicating whether the at least one of the plurality of participants will join the online meeting; and based on the responses, generating, by the server processor, a presentation queue describing an ordering of presenters for the online meeting including a first time slot for a first presenter and a second time slot for a second presenter.

19. The method of claim 18, further comprising:
receiving, by the interface unit, from one of the plurality of participants of the online meeting, a request to modify the presentation queue.

20. The method of claim 19, wherein receiving comprises receiving the request to modify the presentation queue before the meeting begins or during the meeting.

21. The method of claim 18, further comprising:
modifying, by the processor, the presentation queue in response to the request, and sending an updated presentation queue to the participants.

22. A computer-implemented method comprising:
receiving, by an interface unit coupled to a processor, a scheduling request to schedule an online meeting involving a plurality of participants during which multiple participants become presenters to present content during the online meeting;

receiving, by the interface unit, information describing a presentation queue for an ordering of presenters for the online meeting including a first time slot for a first presenter and a second time slot for a second presenter;

sending, by the interface unit, a request to modify the presentation queue to change the first time slot; and receiving, by the interface unit, an updated presentation queue in response to modifications to the presentation queue.

23. The method of claim 22, wherein receiving information describing the presentation queue comprises receiving content for display of the presentation queue in a window, and further comprising displaying the content of the presentation queue in the window.

24. The method of claim 22, further comprising:
sending, by the interface unit, a request to reserve a time slot for the presentation.

* * * * *